United States Patent
Amaru et al.

(10) Patent No.: US 10,247,944 B2
(45) Date of Patent: Apr. 2, 2019

(54) METHOD AND APPARATUS FOR IN-VEHICULAR COMMUNICATIONS

(71) Applicant: SenseDriver Technologies, LLC, Malden, MA (US)

(72) Inventors: Michael Amaru, Reading, MA (US); Kingsley Chin, Fort Lauderdale, FL (US); Aditya Humad, Cambridge, MA (US); Paul Soucy, Arlington, MA (US); Gustavo Herrera, Cambridge, MA (US)

(73) Assignee: SenseDriver Technologies, LLC, Malden, MA (US)

( * ) Notice: Subject to any disclaimer, the term of this patent is extended or adjusted under 35 U.S.C. 154(b) by 248 days.

(21) Appl. No.: 15/106,618

(22) PCT Filed: Dec. 20, 2014

(86) PCT No.: PCT/US2014/071759
§ 371 (c)(1),
(2) Date: Jun. 20, 2016

(87) PCT Pub. No.: WO2015/095849
PCT Pub. Date: Jun. 25, 2015

(65) Prior Publication Data
US 2016/0341962 A1 Nov. 24, 2016

Related U.S. Application Data

(60) Provisional application No. 61/919,536, filed on Dec. 20, 2013.

(51) Int. Cl.
*G02F 1/1335* (2006.01)
*G02B 27/01* (2006.01)
(Continued)

(52) U.S. Cl.
CPC .......... *G02B 27/0149* (2013.01); *B60K 35/00* (2013.01); *B60K 37/06* (2013.01);
(Continued)

(58) Field of Classification Search
USPC .......................................... 349/11
See application file for complete search history.

(56) References Cited

U.S. PATENT DOCUMENTS 3,936,605 A  2/1976  Upton
4,740,780 A  4/1988  Brown et al.
(Continued)

FOREIGN PATENT DOCUMENTS

CN    202986989     6/2013
DE    102011120948  5/2013
(Continued)

OTHER PUBLICATIONS

European Office Action dated Feb. 22, 2018 issued in corresponding European Application No. 14831305.9.
(Continued)

*Primary Examiner* — Richard H Kim
(74) *Attorney, Agent, or Firm* — Onello & Mello, LLP

(57) ABSTRACT

A vehicular heads-up-display system includes a windshield-mountable partially reflective mirror that allows a vehicle user to view material displayed on the partially reflective mirror while, at the same time, viewing the road ahead without obstruction. A mount configured to accept a portable electronic device, such as a smartphone, may be situated to project the display of the portable electronic device to the windshield mountable partially reflective mirror when mounted in a vehicle. A tactile input device, including a wireless interface for entry of and transmission of input from a vehicle user to a smartphone may be configured for mounting on a vehicle steering wheel.

20 Claims, 21 Drawing Sheets

(51) Int. Cl.
*B60K 35/00* (2006.01)
*B60R 11/02* (2006.01)
*G06F 3/16* (2006.01)
*B60K 37/06* (2006.01)
*B60R 11/00* (2006.01)

(52) U.S. Cl.
CPC ...... *B60R 11/0229* (2013.01); *B60R 11/0235* (2013.01); *B60R 11/0264* (2013.01); *G02B 27/0101* (2013.01); *G06F 3/167* (2013.01); *B60K 2350/106* (2013.01); *B60K 2350/1036* (2013.01); *B60K 2350/20* (2013.01); *B60K 2350/928* (2013.01); *B60R 2011/001* (2013.01); *G02B 2027/014* (2013.01); *G02B 2027/0138* (2013.01); *G02B 2027/0154* (2013.01); *G02B 2027/0163* (2013.01); *G02B 2027/0165* (2013.01); *G02B 2027/0169* (2013.01); *G02B 2027/0187* (2013.01); *G02B 2027/0194* (2013.01)

(56) References Cited

U.S. PATENT DOCUMENTS

| | | | |
|---|---|---|---|
| 5,013,135 A | 5/1991 | Yamamura | |
| 5,214,413 A | 5/1993 | Okabayashi et al. | |
| 5,394,203 A | 2/1995 | Murphy et al. | |
| 5,555,502 A | 9/1996 | Opel | |
| 5,677,701 A * | 10/1997 | Okuyama | B60K 37/02 345/7 |
| 5,878,395 A | 3/1999 | Bennett | |
| 5,905,477 A | 5/1999 | Kuwayama et al. | |
| 6,078,428 A | 6/2000 | Rambert et al. | |
| 6,209,767 B1 | 4/2001 | Liou | |
| 6,529,381 B1 | 3/2003 | Schoenfish | |
| 6,789,901 B1 | 9/2004 | Kormos | |
| 6,832,151 B2 | 12/2004 | Kumazaki et al. | |
| 7,111,996 B2 | 9/2006 | Seger et al. | |
| 7,126,583 B1 | 10/2006 | Breed | |
| 7,353,110 B2 | 4/2008 | Kim | |
| 7,565,180 B2 | 7/2009 | Tsai | |
| 7,623,294 B2 | 11/2009 | Harada et al. | |
| 7,734,414 B2 | 6/2010 | Gershony et al. | |
| 8,249,798 B2 | 8/2012 | Hawes et al. | |
| 8,301,108 B2 | 10/2012 | Naboulsi | |
| 8,503,762 B2 | 8/2013 | Ben Tzvi | |
| 8,781,670 B2 | 7/2014 | Dolgov et al. | |
| 8,786,697 B2 | 7/2014 | Kawasaki | |
| 8,947,263 B2 | 2/2015 | Garay et al. | |
| 8,952,819 B2 | 2/2015 | Nemat-Nasser | |
| 9,205,816 B2 | 12/2015 | Kobana et al. | |
| 9,274,336 B2 | 3/2016 | Deubzer et al. | |
| 9,324,234 B2 | 4/2016 | Ricci et al. | |
| 9,596,096 B2 | 3/2017 | Taylor | |
| 9,918,001 B2 | 3/2018 | Pisz | |
| 2002/0068605 A1 | 6/2002 | Stanley | |
| 2003/0043029 A1 * | 3/2003 | Ichikawa | B60R 1/00 340/435 |
| 2004/0160124 A1 | 8/2004 | Arai | |
| 2004/0204004 A1 | 10/2004 | Chen | |
| 2004/0209594 A1 | 10/2004 | Naboulsi | |
| 2006/0012884 A1 | 1/2006 | Snorteland | |
| 2006/0077497 A1 | 4/2006 | Harada et al. | |
| 2006/0261931 A1 | 11/2006 | Cheng | |
| 2007/0082713 A1 | 4/2007 | Tsai | |
| 2007/0217018 A1 | 9/2007 | Fredriksson | |
| 2007/0233376 A1 | 10/2007 | Gershony et al. | |
| 2008/0001727 A1 | 1/2008 | Ohsumi et al. | |
| 2010/0268426 A1 | 10/2010 | Pathak et al. | |
| 2010/0320341 A1 | 12/2010 | Baumann et al. | |
| 2011/0093190 A1 | 4/2011 | Yoon | |
| 2012/0242724 A1 * | 9/2012 | Kurozuka | G02B 27/01 345/697 |
| 2013/0018549 A1 | 1/2013 | Kobana et al. | |
| 2013/0167159 A1 | 6/2013 | Ricci et al. | |
| 2014/0095294 A1 | 4/2014 | Vick et al. | |
| 2014/0121927 A1 | 5/2014 | Hanita | |
| 2014/0210625 A1 | 7/2014 | Nemat-Nasser | |
| 2014/0232564 A1 | 8/2014 | Garay et al. | |
| 2014/0267066 A1 | 9/2014 | Kolehmainen | |
| 2014/0320973 A1 | 10/2014 | Deubzer et al. | |
| 2015/0054760 A1 | 2/2015 | Amaru et al. | |
| 2015/0363348 A1 | 12/2015 | Deratany | |
| 2016/0057335 A1 | 2/2016 | Pisz | |
| 2016/0080163 A1 | 3/2016 | Taylor | |
| 2016/0341962 A1 | 11/2016 | Amaru et al. | |
| 2017/0174129 A1 | 6/2017 | Chin et al. | |
| 2017/0239014 A1 | 8/2017 | Chin et al. | |
| 2017/0305349 A1 | 10/2017 | Naboulsi | |
| 2017/0343805 A1 | 11/2017 | Amaru et al. | |
| 2018/0004473 A1 | 1/2018 | Amaru | |

FOREIGN PATENT DOCUMENTS

| | | | |
|---|---|---|---|
| FR | 2943431 | 9/2010 | |
| FR | 2943431 B1 * | 8/2011 | ......... G02B 27/0149 |
| KR | 20130036934 | 4/2013 | |
| WO | 2015017693 | 2/2015 | |
| WO | 2015095849 | 6/2015 | |
| WO | 2015134840 | 9/2015 | |
| WO | 2016123248 | 8/2016 | |

OTHER PUBLICATIONS

Chinese Office Action dated May 8, 2018 issued in corresponding Chinese Application No. 201480054192.2, with English language summary.
ISRWO issued Apr. 7, 2015 in corresponding International Application No. PCT/US2014/71759.
International Search Report dated Apr. 13, 2016 in related PCT Application No. PCT/US16/15187.
Extended European Search Report dated Jan. 19, 2018 issued in corresponding European Application No. 14872906.4.
Partial European Search Report dated Aug. 14, 2017 issued in corresponding European Application No. 14872906.4.
Colaner, Seth, "$99 SenseHUD Merely Beginning of SenseDriver's Push for Auto Display Platform Dominance". Dec. 31, 2014. Retrieved from the Internet: http://www.tomshardware.com/news/sensedriver-sensehud-99-copilot,28289.html.
Cunningham, Wayne, "SenseHUD, The Smartphone-Powered Windshield Display". Jan. 6, 2015. Retrieved from the Internet: https://www.cnet.com/roadshow/auto/sensedriver-technologies-sensehud/preview/.
Kee, Edwin, "SenseHUD, Is the Ultimate Portable Head-Up Display". Jan. 7, 2015. Retrieved from the Internet: http://www.ubergizmo.com/2015/01/sensehud-is-the-ultimate-portable-head-up-display/.
Marks, Lester Victor, "SenseHUD Turns your Iphone into a portable heads-up display". Jan. 7, 2015. Retrieved from the Internet: http://appleinsider.com/articles/15/01/07/first-look-sensehud-turns-your-iphone-into-a-portable-heads . . . .
EESR dated Mar. 6, 2017 issued in corresponding European Application No. 14831305.9.
International Search Report and Written Opinion dated Jun. 19, 2015 in corresponding PCT Application No. Application No. PCT/US2015/019113.
Stroub, S, "Gearing Up to Battle Snow" 2, Heads Up! Feb. 12, 2014. Retrieved from the Internet: <URL: https://seancrosspoints.wordpress.com/2014/02/12/GEARING-UP-TO-BATTLE-SNOW-2-HEADS-UP/>; paragraph 7.
Eley, B. Magnetstick-Onperiscope Lense for Iphoneand Camera Phones Surfaces May 7, 2013, Retrieved from the internet : <URL: http://geardiary.com/2013/05/07/magnet-stick-on-periscope-lense-for-iphone-and-camera-phones-surfaces/>; paragraph 3; figure 2.
Search Report and Written Opinion dated Dec. 11, 2014 in related PCT application No. PCT/US2014/049225.

* cited by examiner

METHOD AND APPARATUS FOR IN-VEHICULAR COMMUNICATIONS

REFERENCE TO RELATED APPLICATIONS

The present invention claims priority under 35 USC 119(e) to U.S. provisional patent application 61/919,936 entitled METHOD AND APPARATUS FOR IN-VEHICULAR COMMUNICATIONS, filed Dec. 20, 2013, which is incorporated herein by reference in its entirety.

FIELD OF INTEREST

Inventive concepts relate to the field of portable electronic devices, and more particularly to the field of cellular and network display devices.

BACKGROUND

Mobile devices with a display, such as tablets and cellular telephones have become ubiquitous, and, with the advent and growing popularity of smartphones, not only are they a dominant force in voice communications, they increasingly play a role in data communications. The term "smartphone" is generally employed to refer to a cellular telephone that provides features beyond simply voice communications, such as geographical mapping and navigation (using, for example, global positioning system (GPS) links), access to musical libraries, Internet access, and non-voice messaging, such as texting, for example. Such features may be provided by applications, often referred to as "apps." Smartphones may operate using any of a variety of platforms, using any of a variety of operating systems, available from a number of cell-phone manufacturers and cellular service providers.

Although such applications are convenient and popular, many automobile accidents are now attributed to a driver's use of a cell phone or smartphone while driving. As a result a number of states ban drivers from text messaging while driving and some states even ban the use of a cell phone while driving. Many countries ban all cell phone use while driving. These measures have been undertaken, in part, because a driver's use of a cell phone or smartphone can distract the driver from the primary responsibility of safe driving. Three types of distraction attributable to cell phone usage while driving are now widely recognized. Visual distraction occurs when the driver takes his or her eyes off the road to view his cell phone. Manual/mechanical distraction occurs when the driver removes one or both hands from the steering wheel to operate his cell phone. Either of these distractions or other can lead to a cognitive distraction whereby a driver's reaction time may be impaired.

Although systems and methods have been developed or proposed to minimize distractions during cell phone usage, problems remain and, as a result, a need exists for a system that provides information to a driver through a heads-up display and input through a device conveniently mounted on a steering wheel or through voice recognition, for example, so that visual, mechanical and cognitive driving distractions are minimized.

SUMMARY

In exemplary embodiments in accordance with principles of inventive concepts, a vehicular heads-up-display system may include a dashboard- or windshield-mountable partially reflective mirror that is configured to reflect to a vehicle operator the contents of the display of a portable electronic device, such as a smartphone. A mount may be configured to accept a portable electronic device and to project the display of the portable electronic device to the partially reflective mirror when mounted in a vehicle. The dashboard of a vehicle may be configured to accept a portable electronic device and the partially reflective mirror to project the display of the portable electronic device through an aperture in the dashboard onto the partially reflective mirror. In exemplary embodiments, the portable device may be held on the undersurface of the dashboard and the mirror located on the upper/opposite surface of the dashboard proximal to the aperture. In exemplary embodiments the gauge visor portion of the dashboard incorporates the mobile device, aperture and mirror. In such embodiments, the mobile device may be held at the undersurface of the dashboard by spring-loaded, self-centering, universal, paddles to position the device directly below the aperture and the mirror. A tactile input device that includes a wireless interface for entry and transmission of input from a vehicle user to a portable electronic device such as a smartphone mounted in the mount may be configured for mounting on a vehicle steering wheel.

In exemplary embodiments in accordance with principles of inventive concepts, the portable electronic device employs voice recognition software to receive inputs from a vehicle user.

In exemplary embodiments in accordance with principles of inventive concepts, the partially reflective (and partially transmissive, or transparent) mirror may comprise an electrically switchable transreflective mirror, for example. In such exemplary embodiments, the tactile input device may include a wireless interface for communication with a controller for the electrically switchable transreflective mirror. The controller and wireless interface may be mounted, for example, in the mount.

In exemplary embodiments in accordance with principles of inventive concepts, a system for providing information to a driver in a vehicle including a dashboard and a steering wheel includes a smartphone with a display that is configured to carry out two-way communications with other devices and programmable control, a combiner glass capable of partial and electronically adjustable reflective properties that reflects the device display into the field of view of the driver as a heads-up display for the driver, an enclosure that supports the device upright aligning it with the combiner glass to reflect the image of the device, a tactile input device that generates signals representing the location of the driver's finger on the input device and signals representing the actuation of an entry key or reception of voice commands from the driver/user by voice recognition software employed by the portable device, a bracket means for releasably attaching the tactile input device to the steering wheel, and wireless interface for enabling communications between the programmable mobile telephone and the tactile input device whereby images on the first and second displays and responses to manipulation of the tactile input device are processed by the programmable control.

In exemplary embodiments in accordance with principles of inventive concepts a mobile telephone includes telephone input means for enabling a user to provide input thereto and said programmable control defines a driving mode wherein the tactile input device is the sole source of input by the driver and the telephone input means is disabled and a non-driving mode wherein the telephone input means is enabled.

In exemplary embodiments in accordance with principles of inventive concepts a tactile input device includes a touch sensitive pad for allowing contact-based motion detection and means for providing simulated switch/button activation in response to operations of the programmable control.

In exemplary embodiments in accordance with principles of inventive concepts a mobile device includes voice recognition software for enabling a user to provide voice command inputs whereby voice recognition is the sole or additional source of input by the driver.

In exemplary embodiments in accordance with principles of inventive concepts a display system is configured to display navigational information.

In exemplary embodiments in accordance with principles of inventive concepts a display system is configured to display musical selection information.

In exemplary embodiments in accordance with principles of inventive concepts a display system is configured to display vehicle parameters.

In exemplary embodiments in accordance with principles of inventive concepts a display system is configured to display vehicle parameters including vehicle speed.

In exemplary embodiments in accordance with principles of inventive concepts a display system is configured to be responsive to voice commands.

In exemplary embodiments in accordance with principles of inventive concepts a display system is configured to control the switchable mirror to be highly reflective when the vehicle is not traveling.

In exemplary embodiments in accordance with principles of inventive concepts a display system is configured to provide web browsing when the vehicle is not traveling.

In exemplary embodiments in accordance with principles of inventive concepts a display system is configured to collect and store data.

In exemplary embodiments in accordance with principles of inventive concepts a display system is configured to store data including, vehicle speed, vehicle location, and music information.

In exemplary embodiments in accordance with principles of inventive concepts a display system is configured to upload data to remote storage, such as cloud storage.

In exemplary embodiments in accordance with principles of inventive concepts a method of displaying includes providing a windshield mountable partially reflective mirror; providing a mount configured to accept a portable electronic device and to project the display of the portable electronic device to the windshield mountable partially reflective mirror when mounted in a vehicle; and providing a tactile input device including a wireless interface for entry of and transmission of input from a vehicle user to a device mounted in the mount, wherein the tactile input device is configured for mounting on a vehicle steering wheel.

In exemplary embodiments in accordance with principles of inventive concepts a method of displaying includes employing a partially reflective mirror comprises an electrically switchable transreflective mirror.

In exemplary embodiments in accordance with principles of inventive concepts a method of displaying includes employing a tactile input device that includes a wireless interface for communication with a controller for the electrically switchable transreflective mirror.

In exemplary embodiments in accordance with principles of inventive concepts a method of displaying includes displaying navigational information.

In exemplary embodiments in accordance with principles of inventive concepts a method of displaying includes displaying musical selection information.

In exemplary embodiments in accordance with principles of inventive concepts a method of displaying includes displaying vehicle parameters.

In exemplary embodiments in accordance with principles of inventive concepts a method of displaying includes displaying vehicle parameters including vehicle speed.

In exemplary embodiments in accordance with principles of inventive concepts a method of displaying includes responding to voice commands.

In exemplary embodiments in accordance with principles of inventive concepts a method of displaying includes controlling a switchable mirror to be highly reflective when the vehicle is not traveling.

In exemplary embodiments in accordance with principles of inventive concepts a method of displaying includes providing web browsing when the vehicle is not traveling.

In exemplary embodiments in accordance with principles of inventive concepts a method of displaying includes collecting and storing data.

In exemplary embodiments in accordance with principles of inventive concepts a method of displaying includes storing data including, vehicle speed, vehicle location, and music information.

In exemplary embodiments in accordance with principles of inventive concepts a method of displaying includes uploading data to remote/offsite storage, such as cloud storage.

In exemplary embodiments in accordance with principles of inventive concepts a method of displaying includes providing a device with a display configured for two-way communications with other devices and programmable control; providing a combiner glass, partially reflective that reflects the portable device display into the field of view of the driver as a heads-up display for the driver; providing an enclosure that supports the device upright aligning it with the combiner glass to reflect the image of the device; providing a tactile input device that generates signals representing the location of the driver's finger on the input device and signals representing the actuation of an entry key; providing a bracket for releasably attaching the tactile input device to the steering wheel, and providing wireless communications means for enabling communications between the programmable mobile telephone and the tactile input device whereby images on the first and second displays and responses to manipulation of the tactile input device are processed by the programmable control.

In exemplary embodiments in accordance with principles of inventive concepts a method of displaying includes employing a telephone input means for enabling a user to provide input thereto and said programmable control defines a driving mode wherein the tactile input device is the sole source of input by the driver and the telephone input means is disabled and a non-driving mode wherein the telephone input means is enabled.

In exemplary embodiments in accordance with principles of inventive concepts a method of displaying includes employing a tactile input device includes a touch sensitive pad for allowing contact-based motion detection and means for providing simulated switch/button activation in response to operations of the programmable control.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION

Figure 1:
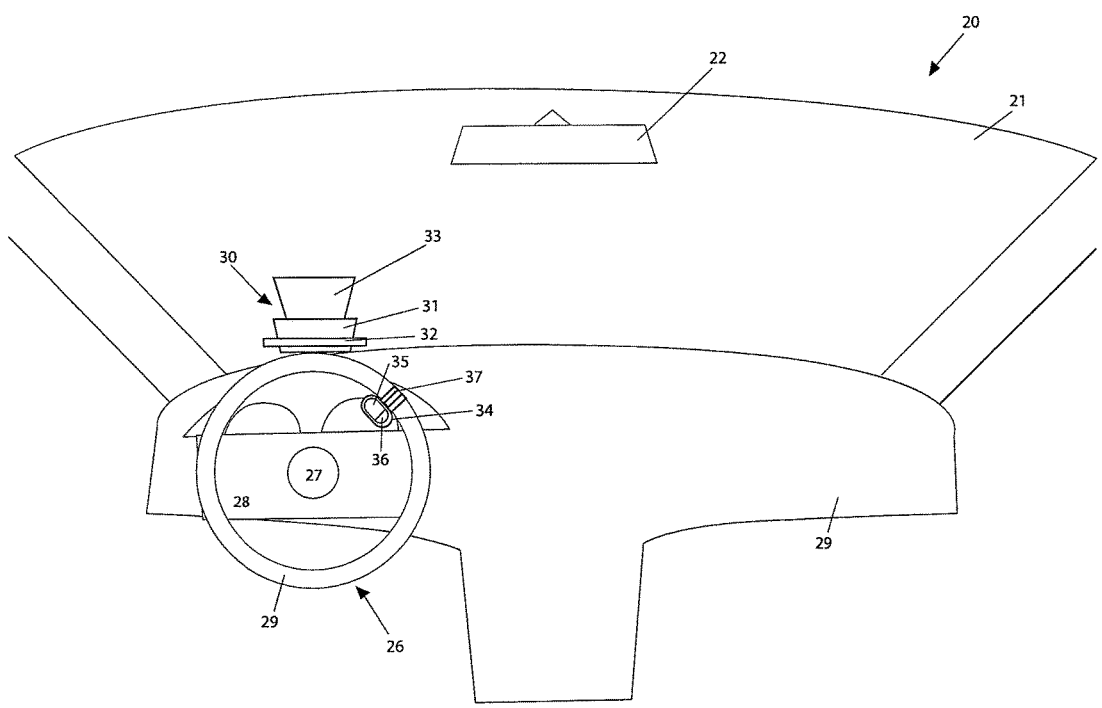
FIG. 1 is a representation of a driver's view of a dashboard and windshield of a vehicle that incorporates a system in accordance with principles of inventive concepts.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

In exemplary embodiments in accordance with principles of inventive concepts a system includes a heads-up-display for use in a vehicle, such as an automobile, truck, heavy equipment, farm implement, forestry harvester, or other vehicle. The heads-up-display, which is semi-transparent, allows an operator to view information provided, for example, from a smartphone without interfering with his view of the road ahead. An operator may interact with the heads-up-display via a tactile input device that may be mounted, for example, on a vehicle steering wheel to provide convenient access to operation of the heads-up-display and/or the smartphone from which information is being displayed.

In exemplary embodiments in accordance with principles of inventive concepts images provided by the heads-up-display are collimated and, as a result, the images appear to be projected out in front of the display, at optical infinity, and an operator's eyes do not need to refocus between viewing the display and the outside world. A system and method in accordance with principles of inventive concepts may include a collimator specifically adapted to collimate images from a device with which the system operates. Additionally, although collimated and, as a result, at optical infinity, the image may appear to be projected at various distances in front of the vehicle, in a range of from one to twenty feet in front of the windshield, for example.

In exemplary embodiments in accordance with principles of inventive concepts, a mobile device may send visible graphic, alphanumeric, or other image data in the form of images to a projector, such as a pico-projector. The projector projects the imagery through an optical assembly that collimates the imagery, thereby providing the collimated imagery to a user at any depth of field within the user's field of vision. In accordance with principles of inventive concepts, the projector may project the imagery through an optical assembly that collimates the projected imagery/data while focusing on a specific point in space in the field of view or depth of field of the user, where the user may view the imagery having the appearance of being projected at a specific distance in front of the vehicle windshield, for example.

FIG. 1 depicts a portion 20 of the interior of an automobile cabin as viewed from a front seat. Windshield 21, rear view mirror 22, dashboard 23, vents 24A, 24B, 24C, and 24D, an instrument cluster 25, and steering wheel 26 are included in this exemplary embodiment. The steering wheel 26 includes a hub 27, radial spokes 28 and an outer ring 29. This exemplary embodiment of a vehicle cabin is for illustrative purposes and inventive concepts are not limited thereto.

An exemplary embodiment of a heads-up display system in accordance with principles of inventive concepts includes a dash- or windshield-mounted assembly 30 that includes a bracket 31 that mounts to the windshield or dashboard 24A. The bracket 31 supports a smartphone with the screen facing up 32 and a combiner glass, described in greater detail in the discussion related to FIG. 6, that reflects the image of the smartphone onto the combiner glass 33 where the image of the smartphone is semi-transparently overlaid on a segment of the view of the area (road, for example) ahead of the vehicle. Bracket 31 may be adjustable in a plurality of planes, thereby allowing for fine adjustment of the smartphone/heads-up-display interface. An input assembly 34 includes a tactile device 35 with a touch pad 36 and an input, or "enter," key 37. A bracket 38 attaches the tactile device 35 to the outer ring 29 of the steering wheel 26. In the exemplary embodiment in accordance with principles of inventive concepts of FIG. 1, the input assembly 34 is mounted for a right-handed driver. The input assembly 34 can also be readily mounted on the other side of the steering wheel 26 for a left-handed driver.

To use the heads-up display system the driver initiates a heads-up display control application in the smartphone 32 and establishes a driving mode. A driving mode may provide visual and audio output that gives detailed driving instructions, for example. The visual output may differ from that which would normally be found in a navigational application. For example, in order to compensate for being projected from the smartphone to the reflective surface of a heads-up-display, the image may be rotated and reversed from what would normally be displayed for direct viewing. The display may be altered in other aspects as well, with, for example, street grids or other details eliminated and only essential elements (left or right turn arrow) displayed. In driving mode, the functions and applications are limited to the heads-up display control application and other applications the heads-up-display control application references during operation. Images projected onto the windshield combiner glass 33 contain essential information from which the driver can make a selection using the input assembly 34. In exemplary embodiments in accordance with principles of inventive concepts, a driver may make a selection by moving a finger, such as the thumb, over the touch pad 36 to highlight an option and then depresses the input key 37 to invoke the selection without having to look at the input assembly 34, thereby minimizing any visual, manual or cognitive distractions during such operations.

Figure 2:
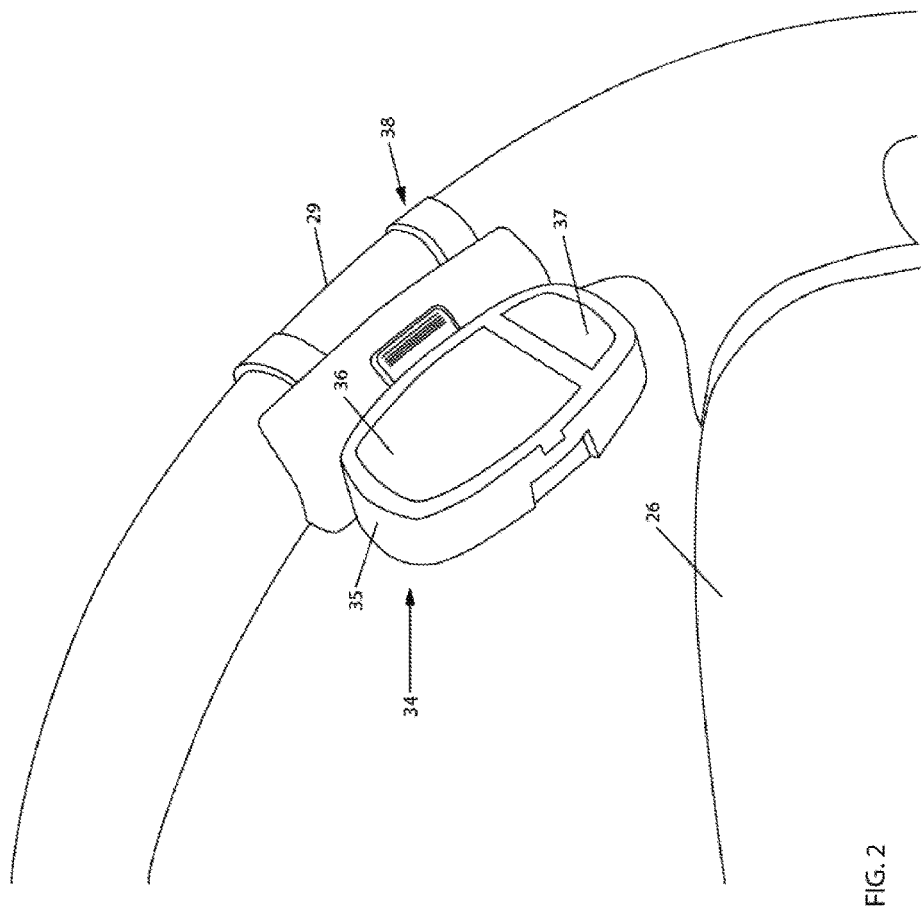
FIGS. 2 through 5 are views that depicts a bracket that attaches a user input control device to a steering wheel from different perspectives
Figure 3:
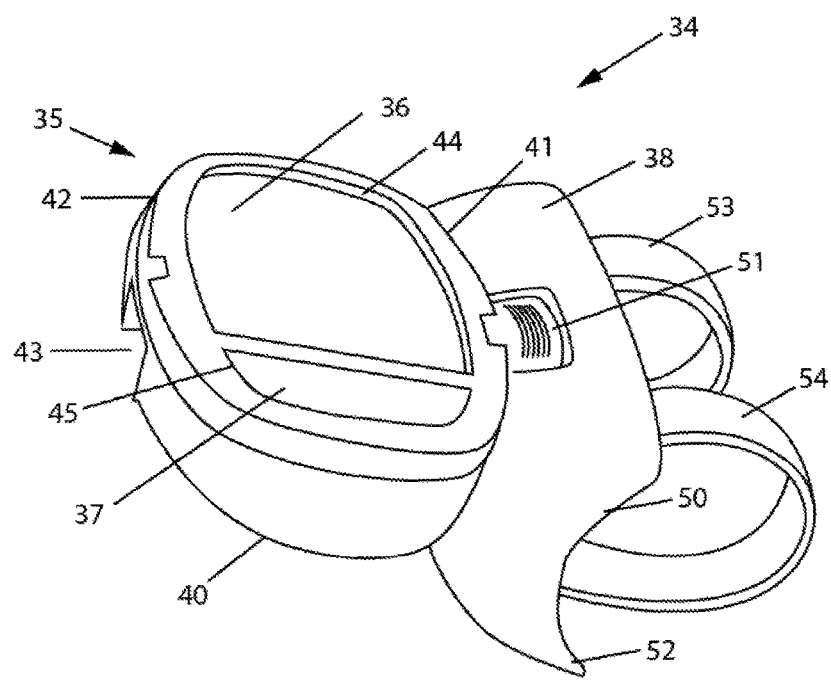
Figure 4:
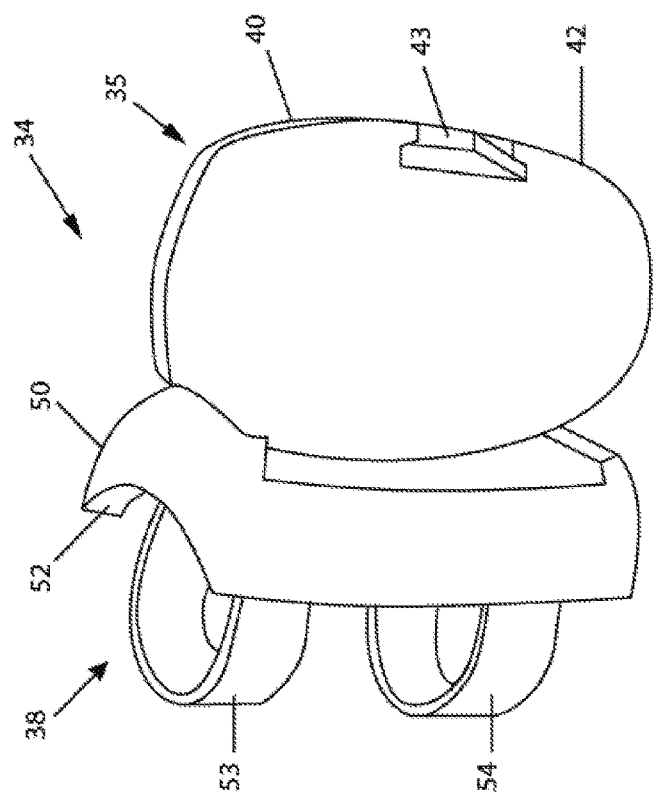
Figure 5:
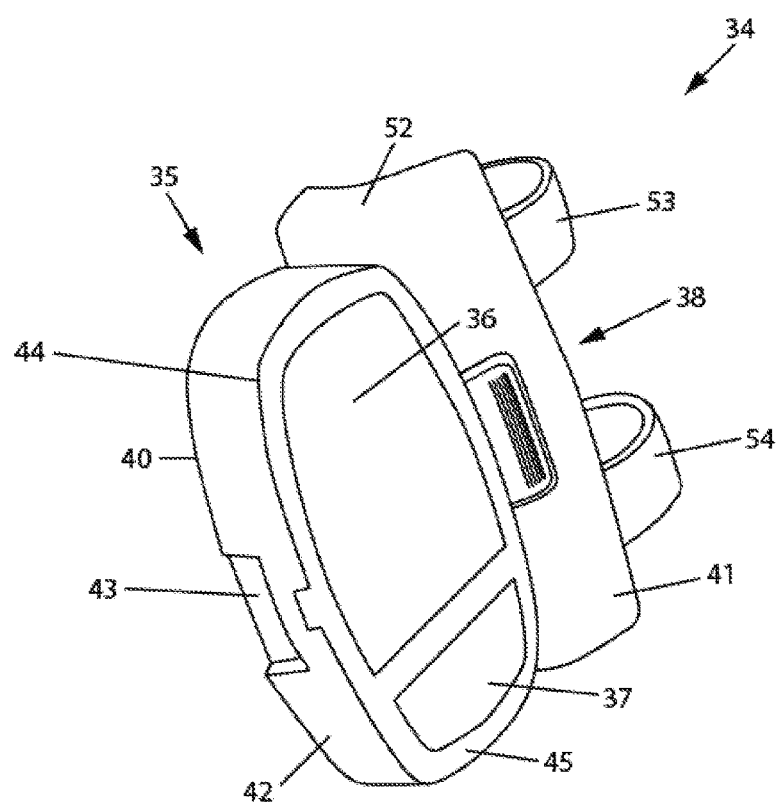

FIG. 2 depicts an exemplary embodiment of an input assembly 34 in accordance with principles of inventive concepts attached to the outer ring 29 of steering wheel 26. FIGS. 3-5 provide different views of input assembly 34, including details of the structure of the tactile device 35 and the bracket 38. Referring to FIGS. 3 and 5, the tactile device 35 includes a housing 40 with an elongated ovoid shape. Each of the sides 41 and 42 includes a mounting structure 43 that interfaces with a complementary mounting structure on the bracket 38 whereby the tactile device 35 is detachable from the bracket 38. Bracket 38 is an exemplary embodiment and inventive concepts are not limited thereto. Housing 40 includes a front opening 44 that frames the touch pad 36. Another opening 45 frames the enter key 37.

In this exemplary embodiment, bracket 38 includes a body portion 50 having a release 51 that complements the mounting structure 43 and tactile device 35 snaps into the corresponding edge of the bracket body portion 50. Depressing the release 51 allows the tactile device 35 and the bracket 38 to separate. The opposite sides of the housing forms a curved body structure 52 that adapts to the outer ring 29 of a steering wheel 26 as shown in FIG. 2. Straps 53 and 54 are molded with the body portion 50 to wrap around the steering wheel outer ring 29 and be received in a capture mechanism (not shown). In accordance with principles of inventive concepts, such strapping or securing mechanisms brackets may be designed to be easily releasable from the outer ring of the steering wheel.

The bracket 38 is also symmetrical around a horizontal central axis. Consequently, the bracket 38 can be positioned on either side of the steering wheel 26 and can receive and capture the tactile device 35 in an orientation on the steering wheel for either right- or left-handed driver. Any number of different capture mechanisms for brackets 38 could be substituted. In accordance with principles of inventive concepts, as shown in FIG. 2, the input assembly 34 may be placed proximate to the driver's normal hand position on the outer ring 29 of a steering wheel. Substantially no movement of the hand is necessary to swipe the touch pad 36 or depress the enter key 37.

In exemplary embodiments in accordance with principles of inventive concepts, tactile device 35 also contains electronic circuitry for sensing the passage of a thumb or other finger across the touch pad 36 and for sensing the depression of the enter key 37. The housing 40 also includes a communications system, which may be a wireless communications system, for communicating with a corresponding system in the smartphone. The Bluetooth system is one example of such a wireless communication system. Typically the tactile device 35 will include a battery power supply and an on/off switch.

Figure 6:
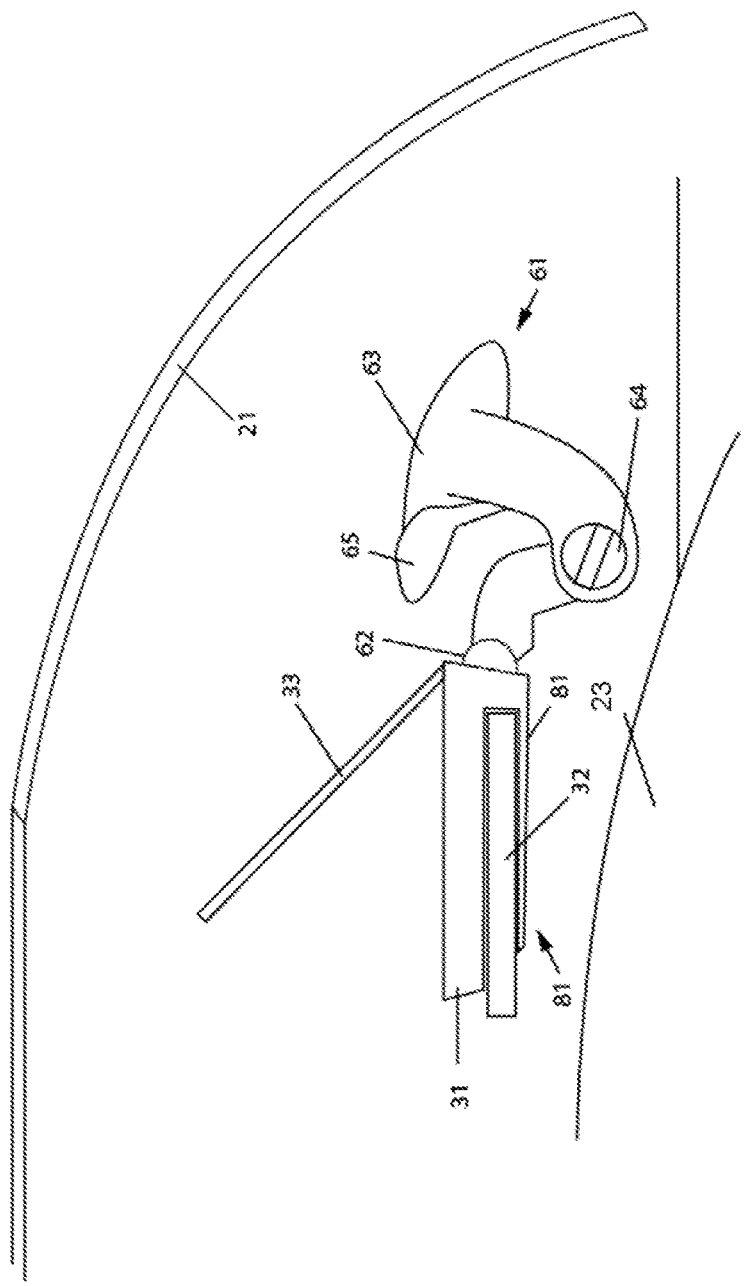
FIGS. 6 through 8 are views that depict the combination of smartphone, and enclosure mount that connects to a vehicle dashboard or windshield, from different perspectives.
Figure 7:
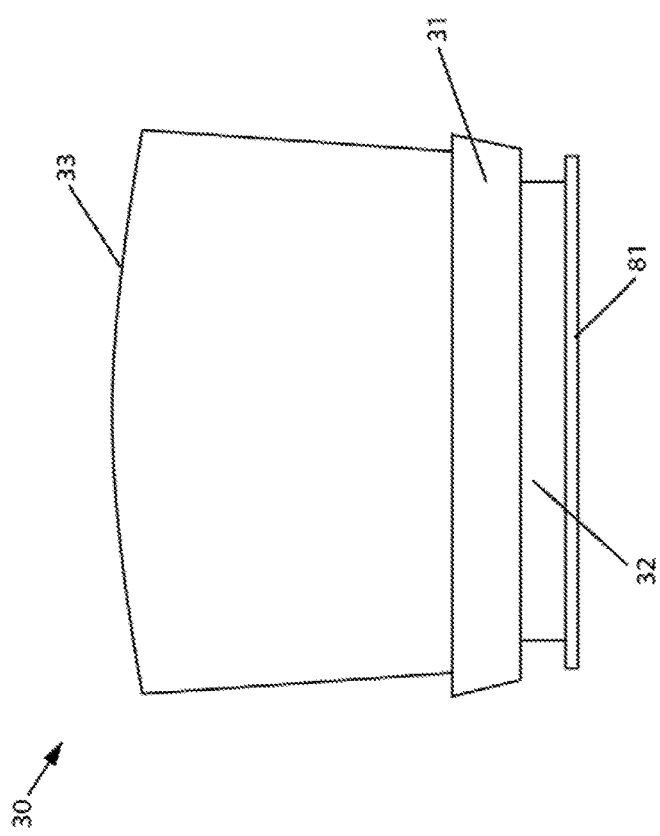
Figure 8:
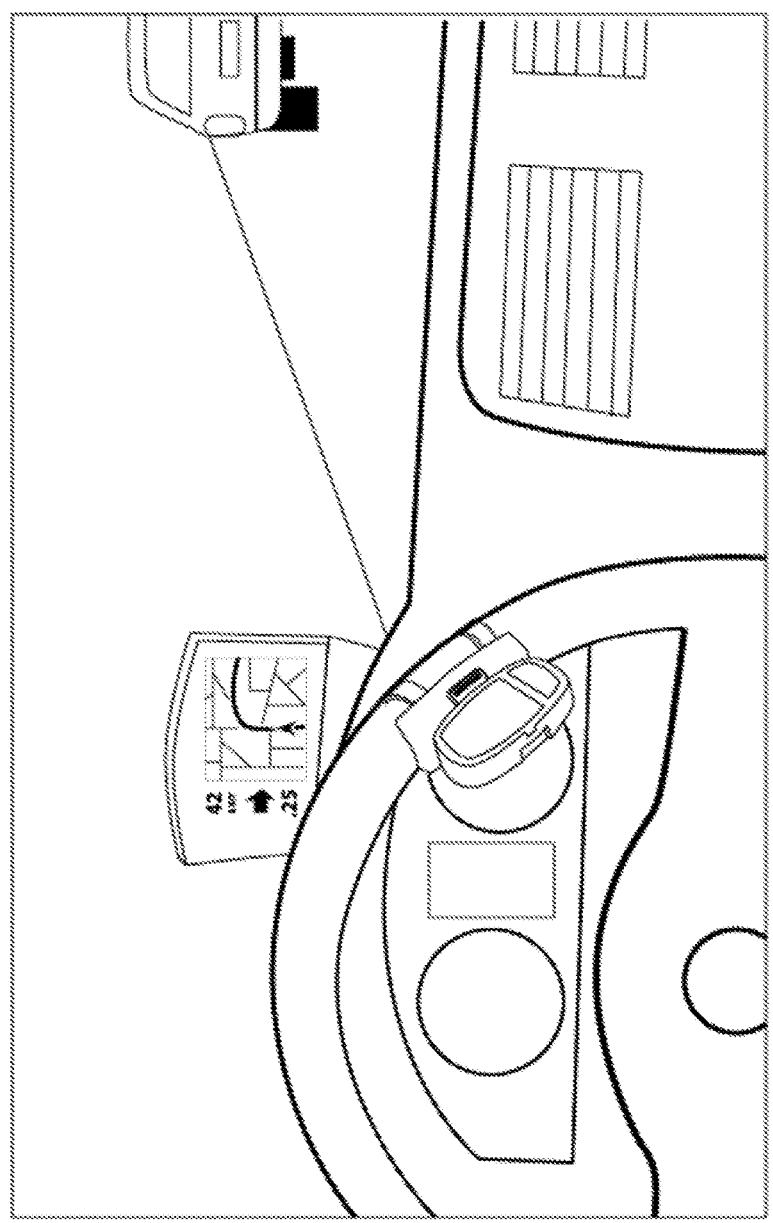

Now referring to FIGS. 6-8, an exemplary embodiment of an optical assembly 31 in accordance with principles of inventive concepts of a heads up windshield mounting assembly 30 includes a partially reflective glass 33, a windshield mounting mechanism 61, a portable electronic device such as a smartphone 32 and enclosure 81. In this exemplary embodiment, the windshield mounting mechanism 61 includes a pivot 62 and a suction cup 63.

Enclosure 81 carries the smartphone 32. In exemplary embodiments in accordance with principles of inventive concepts, a smartphone is inserted into the phone receiver 82 facing up with the control application software open and running. The enclosure 81 attaches to a pivot 62 to provide flexible positioning options. A locking mechanism 74 locks the enclosure 81 relative to the mounting mechanism 61. As can be particularly recognized from FIG. 1, the structure in FIGS. 6-8 is compact and is readily mounted to a dashboard or windshield in a position that will not interfere with a driver's operation of a motor vehicle.

In exemplary embodiments in accordance with principles of inventive concepts, a driver initiates operation of an application that controls operation of the heads-up-display by energizing the smartphone 32 and the tactile device 35 and by attaching the smartphone 32 to the phone receiver 82 in the optical assembly 31. An initial display then appears on the combiner glass 33 shown in FIG. 1.

Figure 9A:
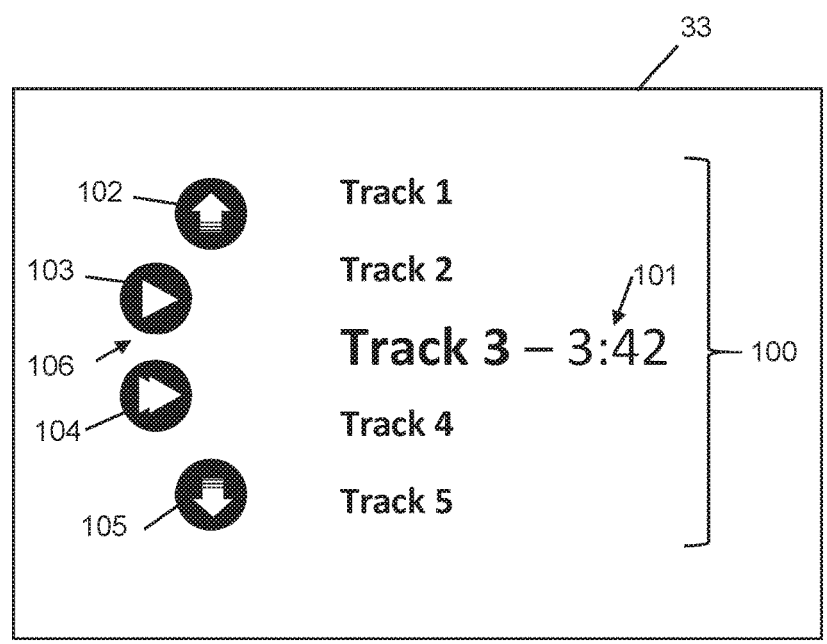
FIGS. 9a through 9c are views of various displays that may be presented in accordance with principles of inventive concepts.

In accordance with principles of inventive concepts, any initial display that is inverted could be used, but, for illustrative purposes, the first display is a music control screen shown in FIG. 9A. A music player control application connects to music files on a portable electronic device such as a smartphone 32 or music files on the interne by means of the carrier connection included in the smartphone 32. In this exemplary embodiment, the display includes a portion 100 of a track list, with a selected track highlighted at 101 as shown for Track. The driver also sees four control buttons to the left of the display of FIG. 9A. A first control button 102 causes the track selection to scroll up the list. A second button 103 causes the music player application to switch between a play mode and a pause mode. Button 104 provides a skip function that causes the player application to skip to a next track. Button 105 performs a scroll down function that causes the track selection to move down the list.

In FIG. 9A the button 103 is highlighted as shown at 106. While viewing this image on combiner glass 33 of the windshield, the driver may engage the Enter key 37 to toggle the operations between the play and pause modes. If the driver wants to skip a track, a downward swipe on the touch pad 36 produces a "down arrow" function whereupon the button 104 is highlighted. While highlighted, any activation of the Enter key 37 causes the skip function to occur.

As described above, controlling music with a tactile device 35 and display in accordance with principles of inventive concepts, such as that in FIG. 9A causes only minimal driver distraction. The driver can observe the display in FIG. 9A while maintaining eye contact with the roadway. While swiping the touchpad 36 and clicking to enter key 37 the driver's hand need not be removed from the steering wheel. Consequently, such operations minimize visual distractions, manual distractions and cognitive distractions.

In order to look at another screen, the driver swipes his or her thumb across the touchpad 36 in a transverse, or horizontal, direction. The control application interprets this action as a left arrow or right arrow type of operation and selects an adjacent display, such as navigation display 110 in FIG. 9B that appears in the combiner glass 33 (also referred to herein as windshield portion 33). This illustrative example assumes that the navigation system has been initialized to input a destination prior to switching the system to a driving mode. As shown, this display contains minimal content, namely a road map 111 of the vicinity, a display 112 that identifies the next point (waypoint), a display 113 that indicates the direction of any turn at that waypoint, and a display 114 that indicates the distance to that waypoint. Again, visual, manual and cognitive distractions are minimized.

A system in accordance with principles of inventive concepts can also utilize the communications capability of a portable electronic device such as a smartphone in handling incoming text messages, emails and data. When the smartphone 32 processes an incoming text message or email, it extracts the sender's telephone or email address as appropriate. The system also switches the display to a communications screen, such as that shown in FIG. 9C. Whatever apps are then controlling these displays in FIGS. 9A and 9B continue to operate and the interrupted display will return. In this exemplary embodiment in accordance with principles of inventive concepts, block 121 displays the telephone number or email address. The balance of the display includes buttons 122-125 allow a user to select from among various communications modes, such as text mode, or yes or no response, for example.

In exemplary embodiments in accordance with principles of inventive concepts, using the same selection process as described with respect to FIG. 9 A, button 122 is selected for the text in the email or text message to be converted to speech so the driver can listen to the message. Many times there is a question that needs to be answered with a simple "yes" or "no". Selecting the button 123 causes the system to transmit and return an affirmative response by corresponding text message or email. Selecting button 124 causes a negative answer to be returned. These buttons can also be customized to provide other messages as the driver may desire. For example, button 125 also transmits a customizable message. As an example, selecting button 125 could return a message indicating that the driver is actually driving and will respond in the future.

Figure 9B:
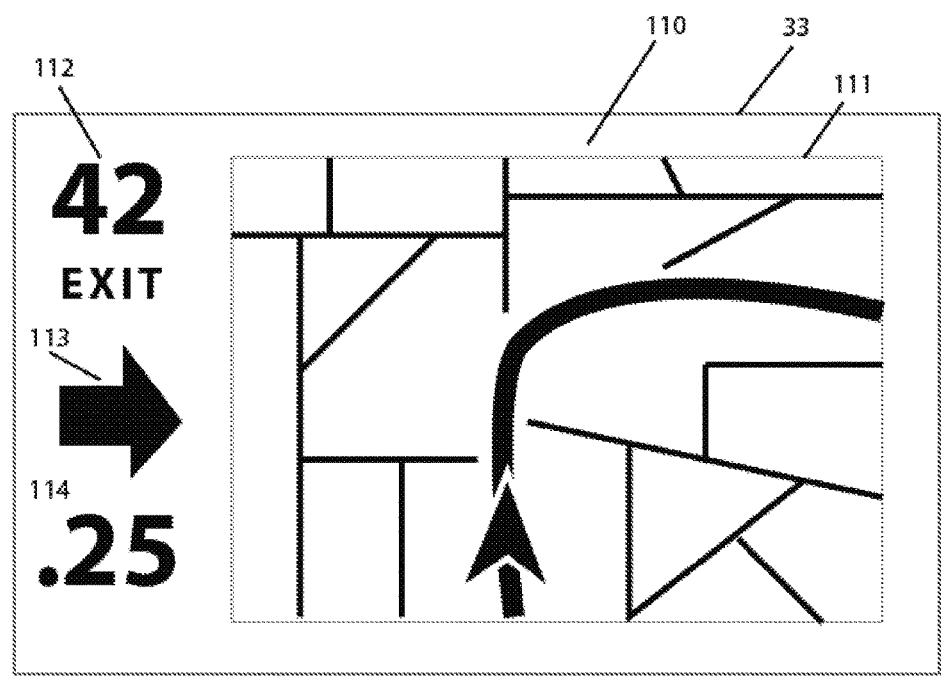
Figure 9C:
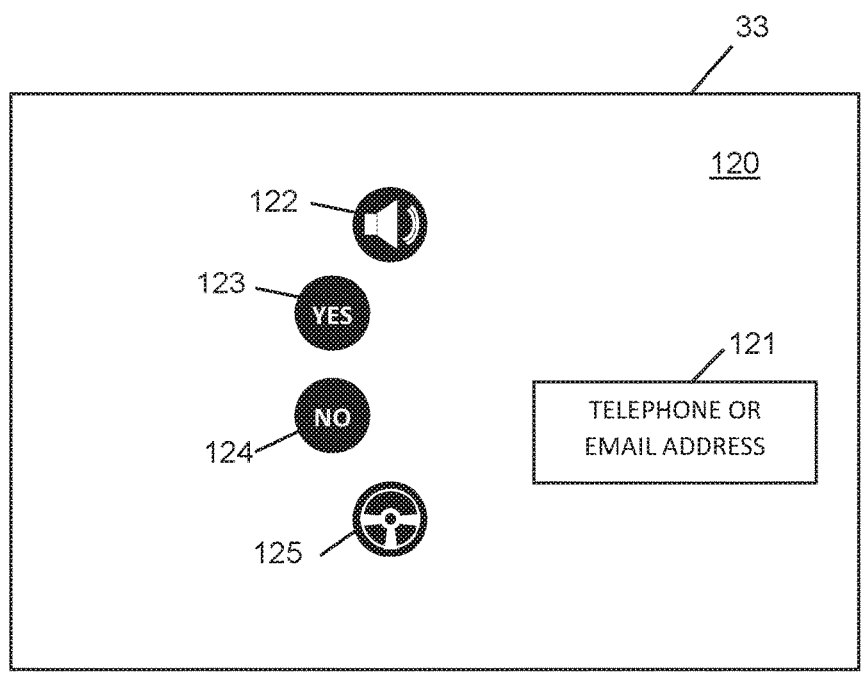

Exemplary embodiments of inventive concepts have been described in the context of displaying three different panels as shown in FIGS. 9A, 9B and 9C. However, inventive concepts are not limited thereto. For example, a system and method in accordance with principles of inventive concepts can generate displays that are specific to unique needs of user groups. Such a display would allow a company to communicate with individual drivers with information that is tailored to that company, for example. Vehicle speed and other characteristics (for example, rpm, engine temperature, etc.) may be displayed along with other information and telephone calls may be executed while other applications, such as a navigational application, are running, for example.

Figure 10:
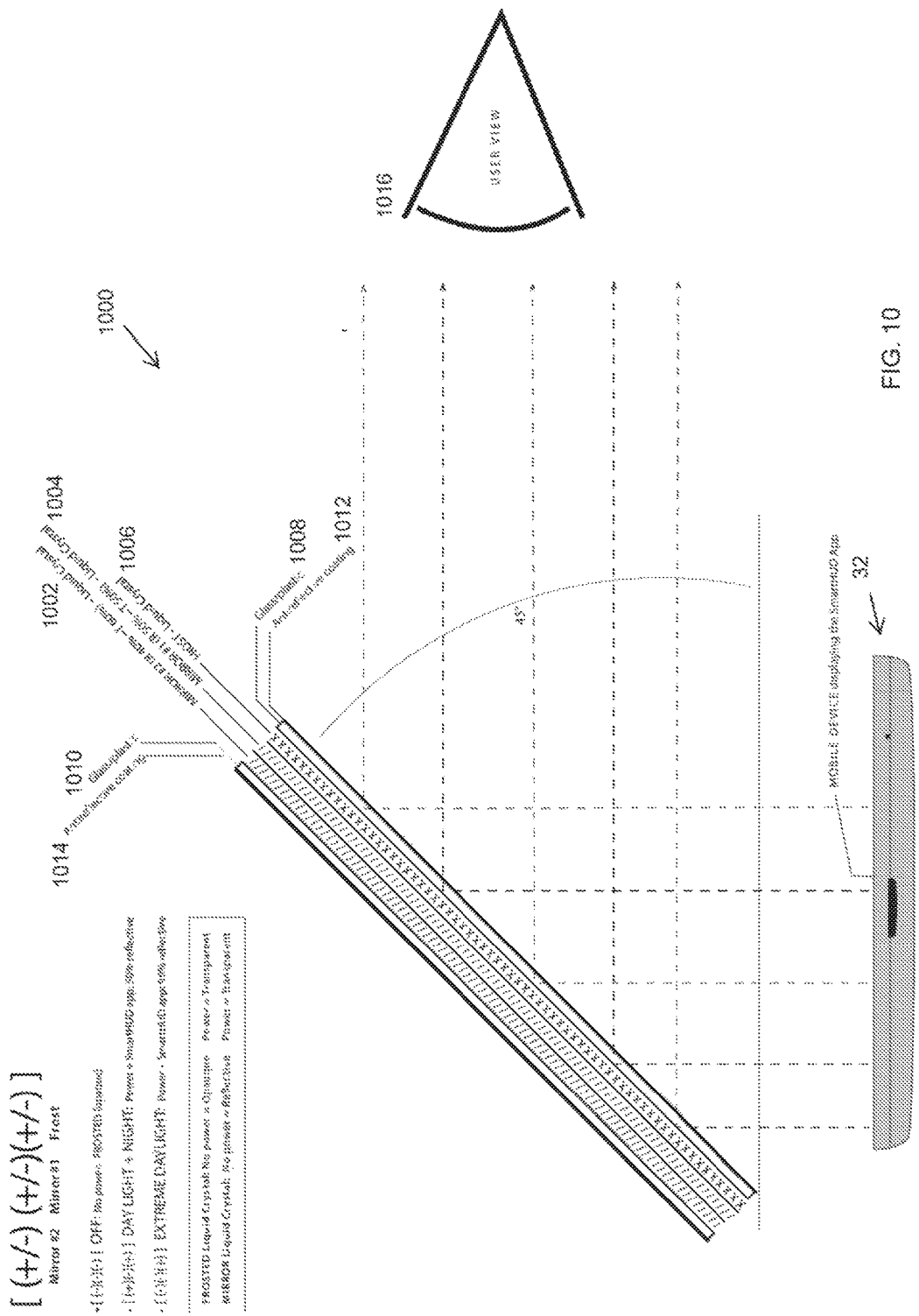
FIG. 10 is a diagram of an electrically switchable transreflective mirror such as may be employed by a display system in accordance with principles of inventive concepts.

In exemplary embodiments in accordance with principles of inventive concepts, a vehicular heads-up-display may employ a heads up display may employ a switchable mirror (also referred to herein as a tunable mirror or electrically switchable transreflective mirror) in the glass combiner 33, as illustrated in FIG. 10. Switchable mirrors are known and described, for example, in U.S. Pat. No. 7,009,666 issued to Khan et al and assigned to Kent Displays Incorporated. In the exemplary embodiment of FIG. 10, switchable mirror 1000 includes liquid crystal layers 1002, 1004, and 1006. Liquid crystal layers 1002 and 1004 are second and first mirror layers, respectively. In exemplary embodiments in accordance with principles of inventive concepts, mirror layer 1004 may have a reflectance of 50% (and transmissivity of 50%), and mirror layer 1002 may have a reflectance of 40% (and transmissivity of 60%). Layer 1006 is a "frost" layer that, under electronic control, may switch from translucent to highly reflective. Protective layers 1008, 1010 seal the liquid crystal layers, and may include glass or plastic, for example. Anti-reflective coatings 1012, 1014 are formed over protective layers 1008 and 1010, respectively. In this exemplary embodiment switchable mirror 1000 is inclined at 45☐ to the plane of smartphone 32, with viewer 1016 positioned at 90☐ to the plane of the smartphone 32.

In accordance with principles of inventive concepts, the degree of reflectance of switchable mirror may be electronically controlled to adjust to ambient lighting conditions or other factors. Control of the reflectance may be manual or automatic. In exemplary embodiments in accordance with principles of inventive concepts a light sensor may be employed to determine ambient light levels and to automatically adjust the reflectivity of the switchable mirror 1000 accordingly. A portable electronic device such as a smartphone camera may be employed as a light sensor for light-level sensing, for example. A heads up display in accordance with principles of inventive concepts may include a wireless interface and a link between the smartphone and switchable mirror 1000 may be implemented using a wireless link employing Bluetooth technology, for example, in order to adjust the reflectance of the switchable mirror according to light levels detected by the smartphone camera.

In exemplary embodiments in accordance with principles of inventive concepts, switchable mirror 1000 may be controlled in a manner that allows for greater interaction, for example, when a vehicle in which it is employed is not in motion. When the vehicle is at rest the switchable mirror 1000 may be tuned to a high degree of reflectivity (in the range of 60% to 90%, for example), allowing for more detailed graphics to be displayed to the user. Control of reflectivity may be automatic, with the system sensing motion (or lack thereof) or manual, with a user directly controlling the reflectivity of the switchable mirror 1000. In accordance with principles of inventive concepts, a system in accordance with principles of inventive concepts may prevent, or "lock out," use of high reflectivity while the vehicle is in motion. When the switchable mirror is in a high reflectance mode of operation, though, a system in accordance with principles of inventive concepts may present more detailed information, enabling the use of a greater range of applications. For example, an Internet browser may be displayed, allowing a user to search the Internet and interact with the browser through voice commands, for example. As with other applications, a system in accordance with principles of inventive concepts alters images displayed by the smartphone (for example, by inverting) to accommodate projection onto switchable mirror 1000. When in an Internet mode of operation, the browser may be configured to land on a search engine of the user's choice, for example.

In exemplary embodiments in accordance with principles of inventive concepts may integrate a plurality of functions, such as GPS navigation, text messaging, music management, and voice telephone calls into one system. Such a system may provide a heads up display, voice command, and tactile interface for user interaction that requires only low levels of attention and that, consequently, requires only a low level of user attention. Voice commands available to a user may include "navigate," "speedometer," and "call," for example. A user's music library, contact list, and other assets available in his smartphone may be available through a system in accordance with principles of inventive concepts and those assets may be available through voice commands, for example, to locate and play a song, or to send a text message or voice call to a selected contact. In accordance with principles of inventive concepts, background data, such as speed, location, and usage may be collected and stored locally then uploaded to a cloud server for analytical purposes, for example.

In exemplary embodiments a device in accordance with principles of inventive concepts may be incorporated into a vehicle dashboard. Such an incorporation may be temporary or fixed. For example, a portable device in accordance with principles of inventive concepts may be mated with a receptacle in a vehicle dashboard. In the sectional, front plan, top cutaway, and top cutaway views, respectively, of FIGS. 11A, 11B, 11C, and 11D of an exemplary embodiment of an in-dashboard vehicular heads-up-display system in accordance with principles of inventive concepts an opening in an upper portion of a vehicle dashboard allows access to a portable electronic device's (e.g., smartphone's) display for upward projection onto a screen, such as a partially transparent/reflective mirror, for the formation of an in-vehicle heads up display. The opening in the upper portion of the vehicle dashboard may be located, for example, in a gauge visor section of the dashboard, positioned for convenient viewing by the vehicle operator. The electronic device may be held under the dashboard by a spring-loaded, self-centering, universal (that is, adjustable to accommodate various sizes and shapes), holder that may include adjustable paddles, for example. In exemplary embodiments in accordance with principles of inventive concepts a portable electronic device may interface with a vehicle's electronic control unit (ECU) to provide the vehicle's diagnostic data for display on a heads-up display, for example. In exemplary embodiments, the interface between the electronic device and the vehicle's ECU may be a wireless link through the vehicle's OBDII or CANbus port, for example.

Figure 11A:
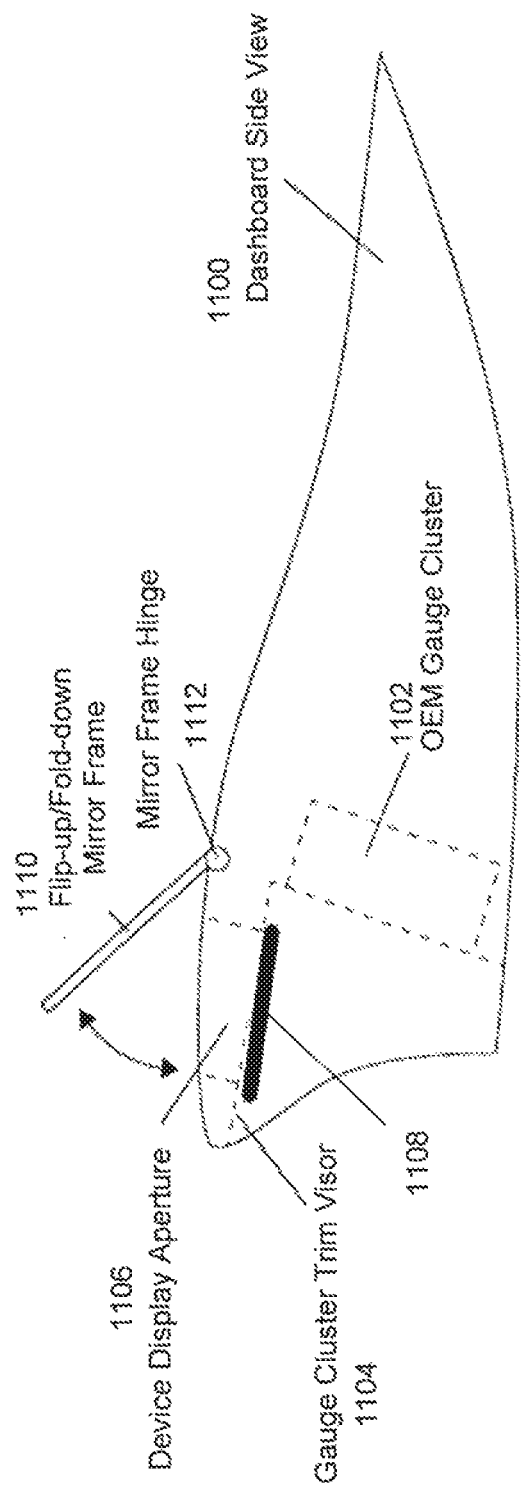
FIGS. 11a through 11d are various views of a dashboard-mounted heads up vehicular display system in accordance with principles of inventive concepts.

In the exemplary embodiment of FIG. 11A dashboard 1100 shields a gauge cluster 1102 under gauge cluster visor 1104. Aperture 1106 allows for the upward projection of the display of device 1108 to adjustable (flip-up, for example) partially reflective mirror 1110, which is hinged 1112 to allow for positioning adjustment to accommodate vehicle operators of various heights, or for removing the mirror 1112 from, or placing the mirror 1112 into, an operator's line-of-sight, for example.

Figure 11B:
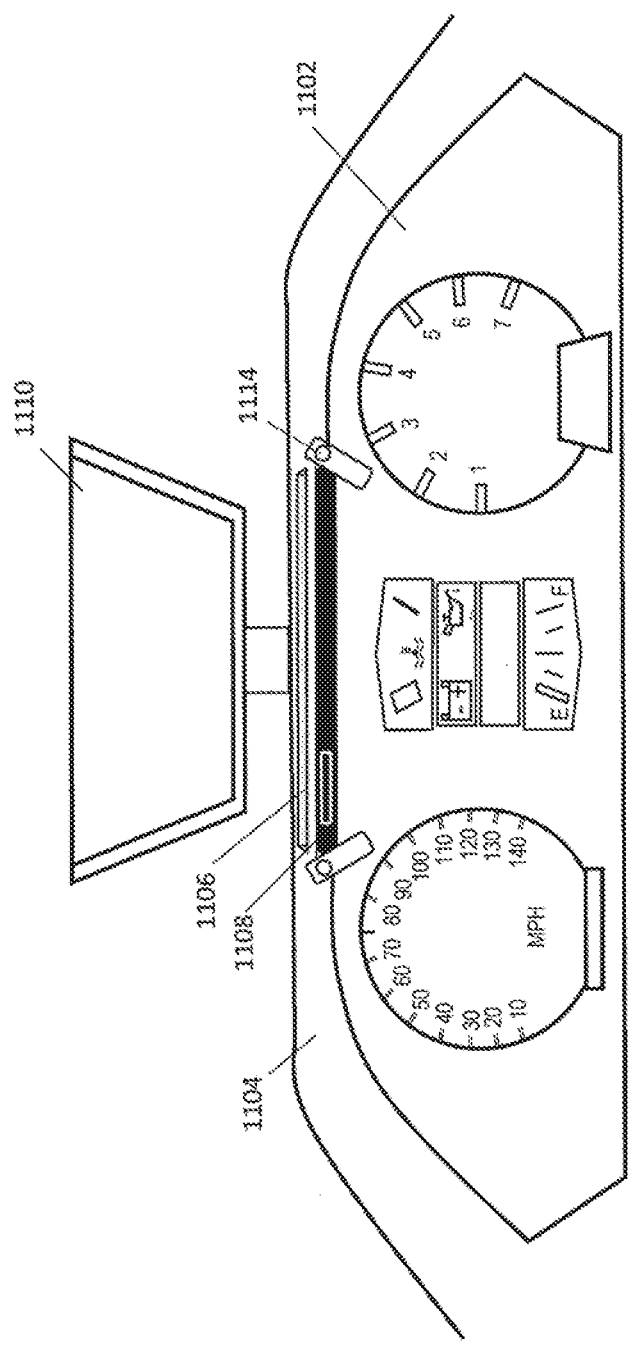

The front plan view of FIG. 11B includes dashboard 1100 shields a gauge cluster 1102 under gauge cluster visor 1104, aperture 1106, device 1108, and partially reflective mirror 1110, a detailed description of which will not be repeated here. In this exemplary embodiment device 1108 is held in place by spring-loaded self-centering paddles 1114 under aperture 1106 for projection of display images onto partially-reflective mirror 1110. The spring-loaded paddles 114 accommodate devices, such as smartphones, tablets or phablets, having different physical profiles and, as such, provide a universal platform for positioning and securing device 1108.

Figure 11C:
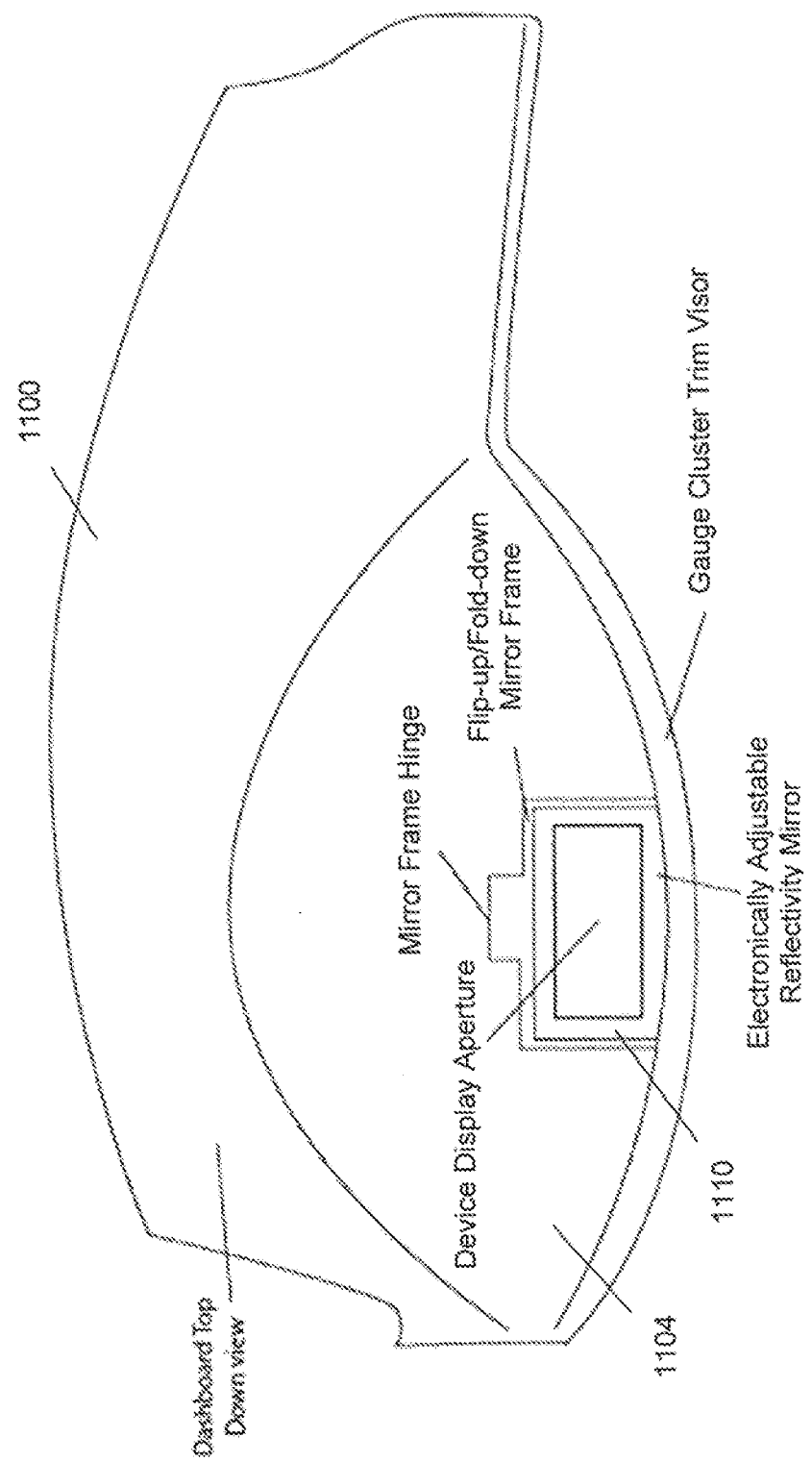
Figure 11D:
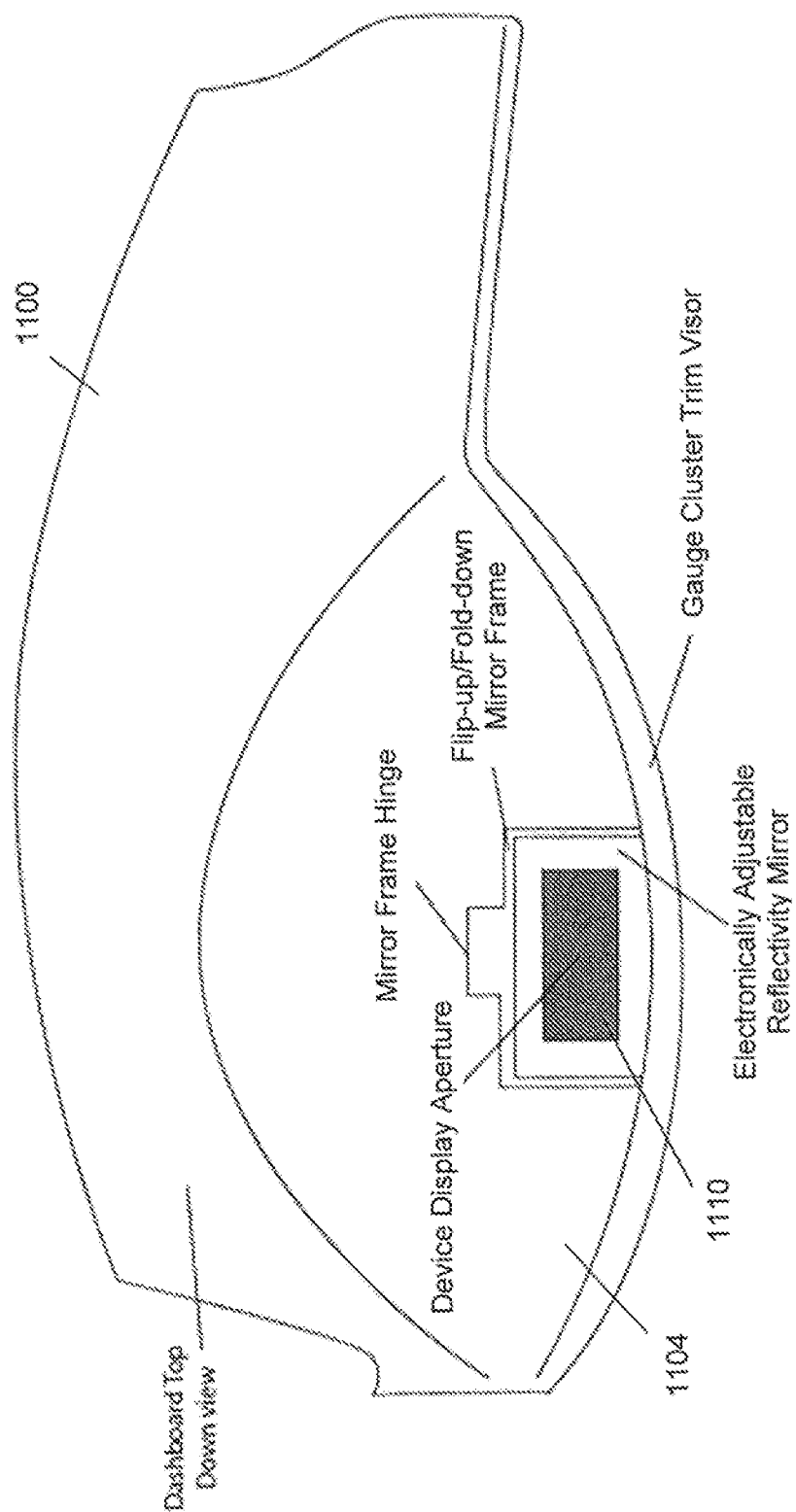

The top plan views of FIGS. 11C and 11D illustrate a dashboard including a heads-up vehicular display system in accordance with principles of inventive concepts in which the partially reflective mirror 1110 is positioned in the upright and folded (down) positions, respectively.

Figure 12A:
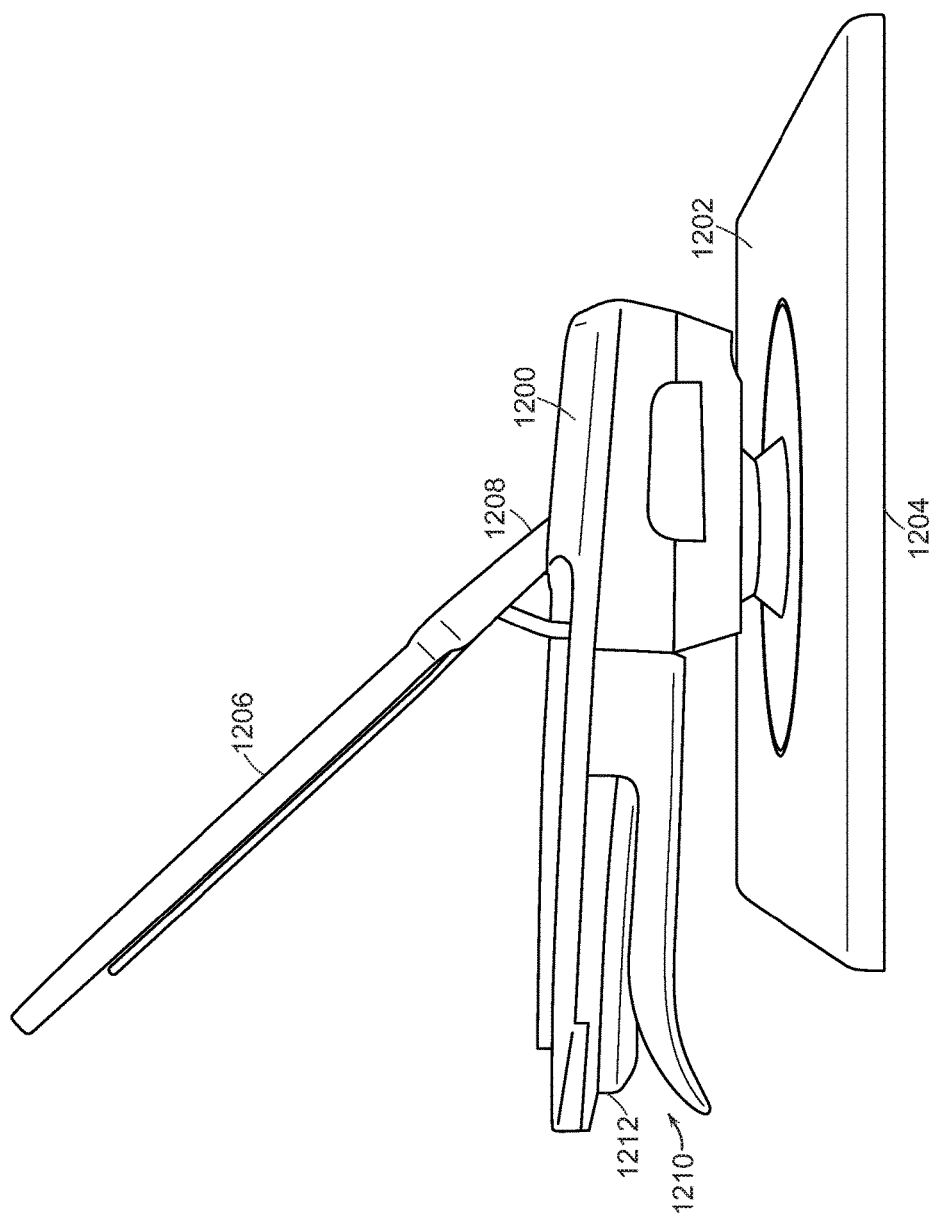
FIGS. 12a though 12c are various views of a dashboard mountable heads up vehicular display in accordance with principles of inventive concepts.
Figure 12B:
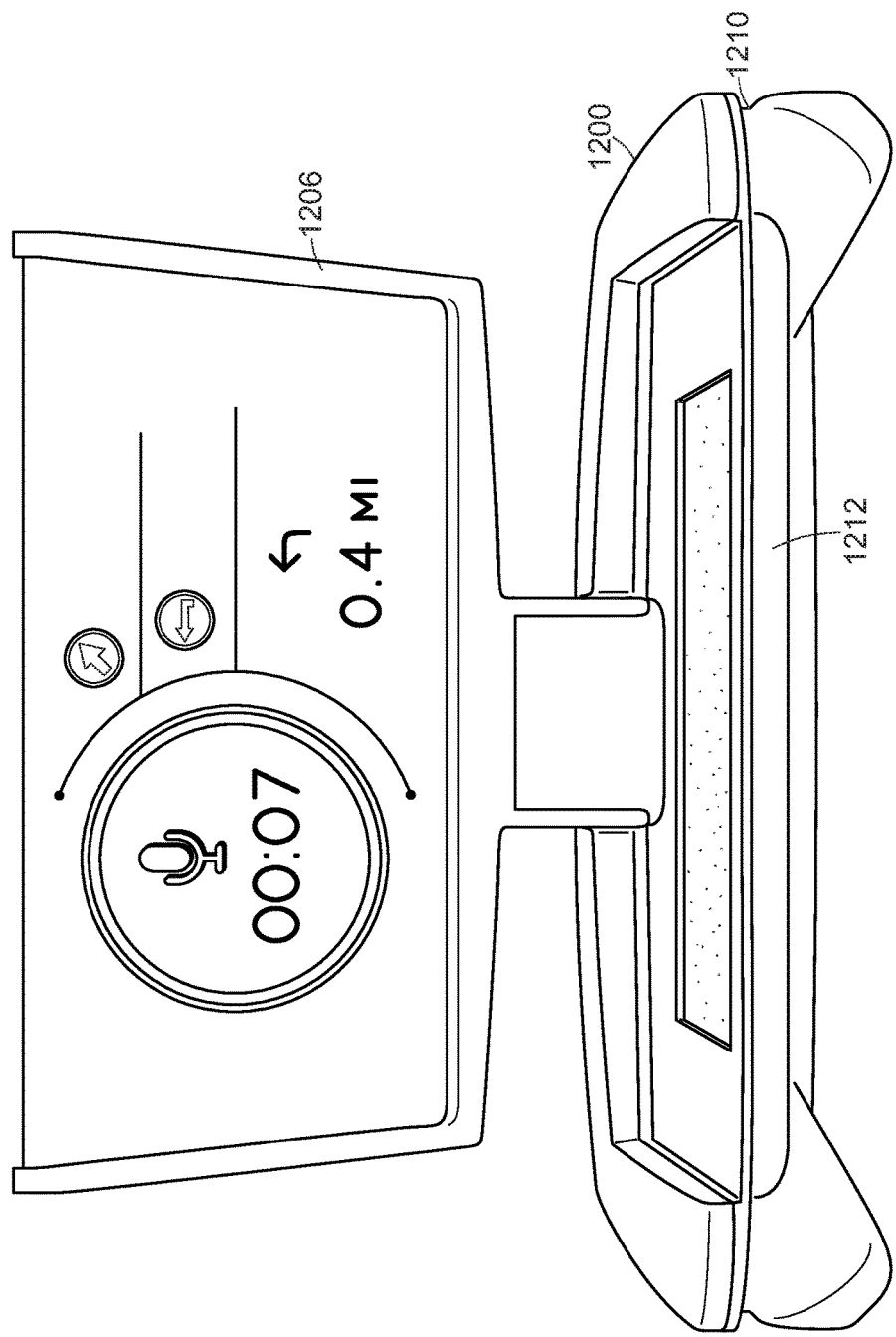
Figure 12C:
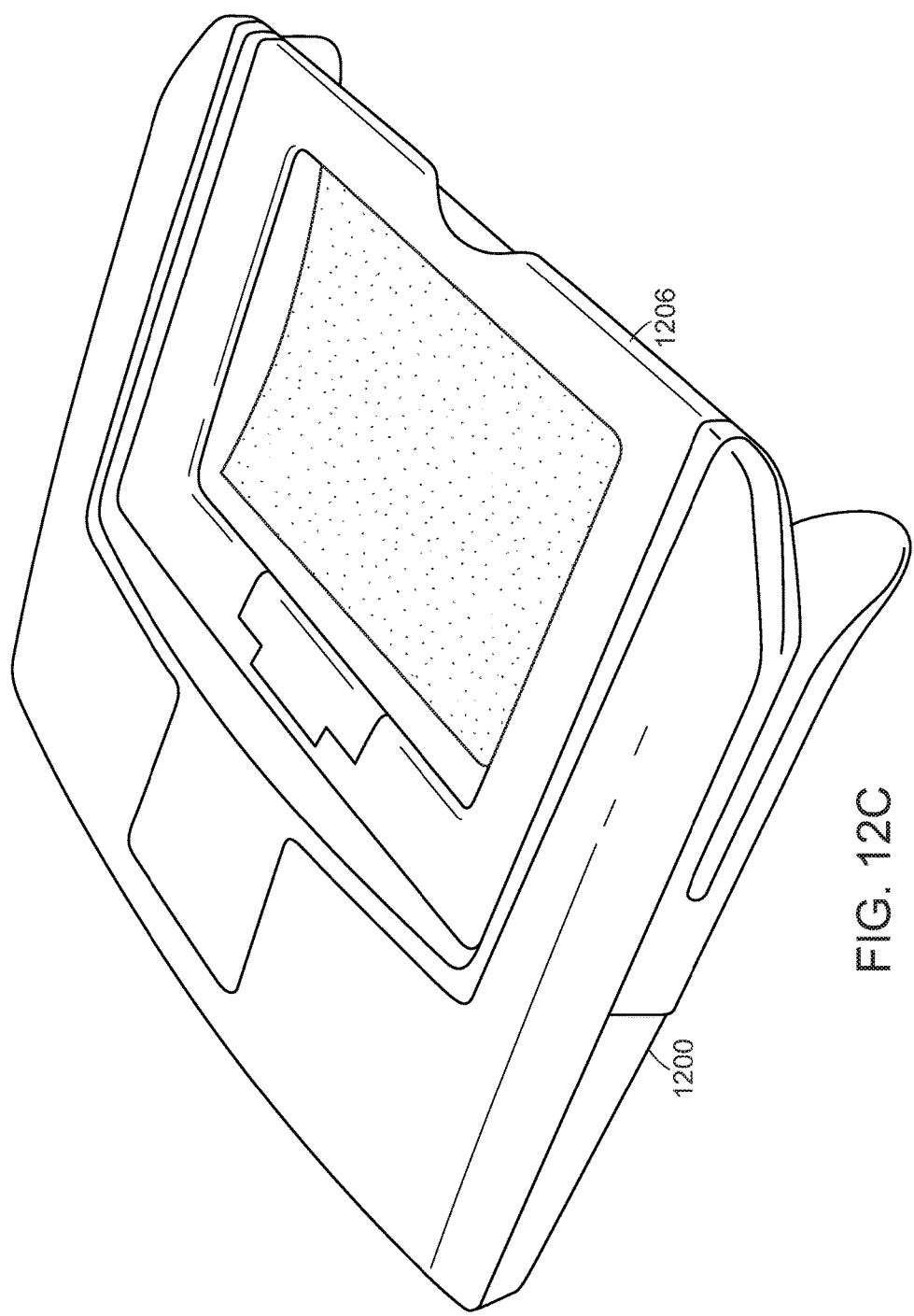

In the side, front plan, and perspective views, respectively, of FIGS. 12A, 12B, and 12C of an exemplary embodiment of a vehicular heads-up-display system in accordance with principles of inventive concepts a dash-top embodiment allows for placement of a system base on or within a vehicle dash-top.

The side view of FIG. 12A illustrates an exemplary embodiment of a system in accordance with principles of inventive concepts in which a housing 1200 is mounted on a base 1202 through a swivel mount 1204, which may be a ball-mount that provides orientation-adjustment of housing 1200 through a limited range of motion in 360 horizontal degrees, for example. Partially reflective mirror 1206 is affixed to housing 1200 through hinged joint 1208. Device receptacle 1210 positions and retains a portable electronic device 1212 for use by a vehicle operator. Imagery from electronic device 1212 may be projected upward to be displayed on partially-reflective mirror 1206 for use by a vehicle operator. In exemplary embodiments in accordance with principles of inventive concepts, the electronic device 1212 may be operated "hands-free" through voice commands, for example, thereby avoiding the need for a tactile user interface. Base 1202 may be affixed to the top of a vehicle's dashboard (or within a depression therein) using permanent (screws, adhesives, etc) or temporary (hook and loop, semi-permanent adhesive, etc) means.

The front plan view of FIG. 12B illustrates the system of FIG. 12A from the front, with the partially reflective mirror 1206 deployed (upright) with information from a portable electronic device 1212 displayed for viewing by a vehicle operator.

The perspective view of FIG. 12C illustrates the system of FIGS. 12A and 12B, with the partially reflective mirror 1206 in a fully stored (horizontal) position. In this position, a vehicle operator has an open line-of-sight to the road in front of him.

Figure 13B:
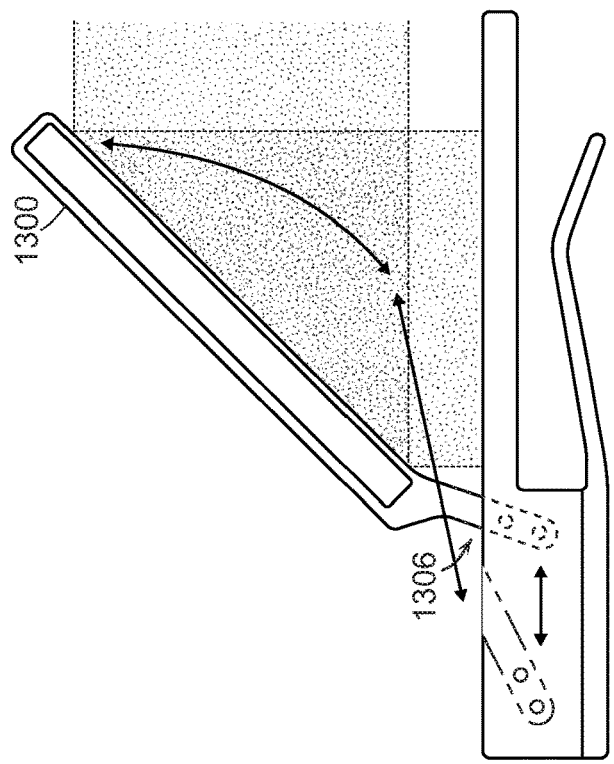
FIGS. 13a and 13b are various views of a dashboard mountable heads up vehicular display illustrating non-translatable and translatable hinged partially reflective mirror mounts.
Figure 13A:
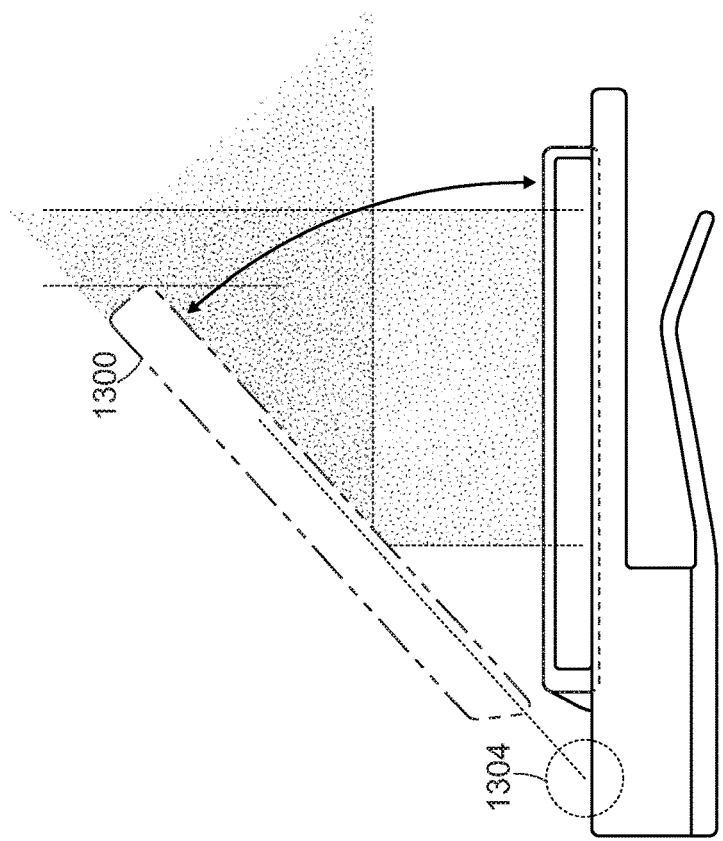

In the exemplary embodiments of FIGS. 13A and 13B a partially reflecting mirror 1300 is attached to a housing 1302 through fixed 1304 and gliding 1306 hinges, respectively. The gliding hinge embodiment of FIG. 13B allows the partially reflecting mirror 1300 to translate forward as it is deployed, allowing the full screen to be viewable by an operator in situations where a fixed hinge, as that of FIG. 13A, would not provide that level of viewability.

Figure 14:
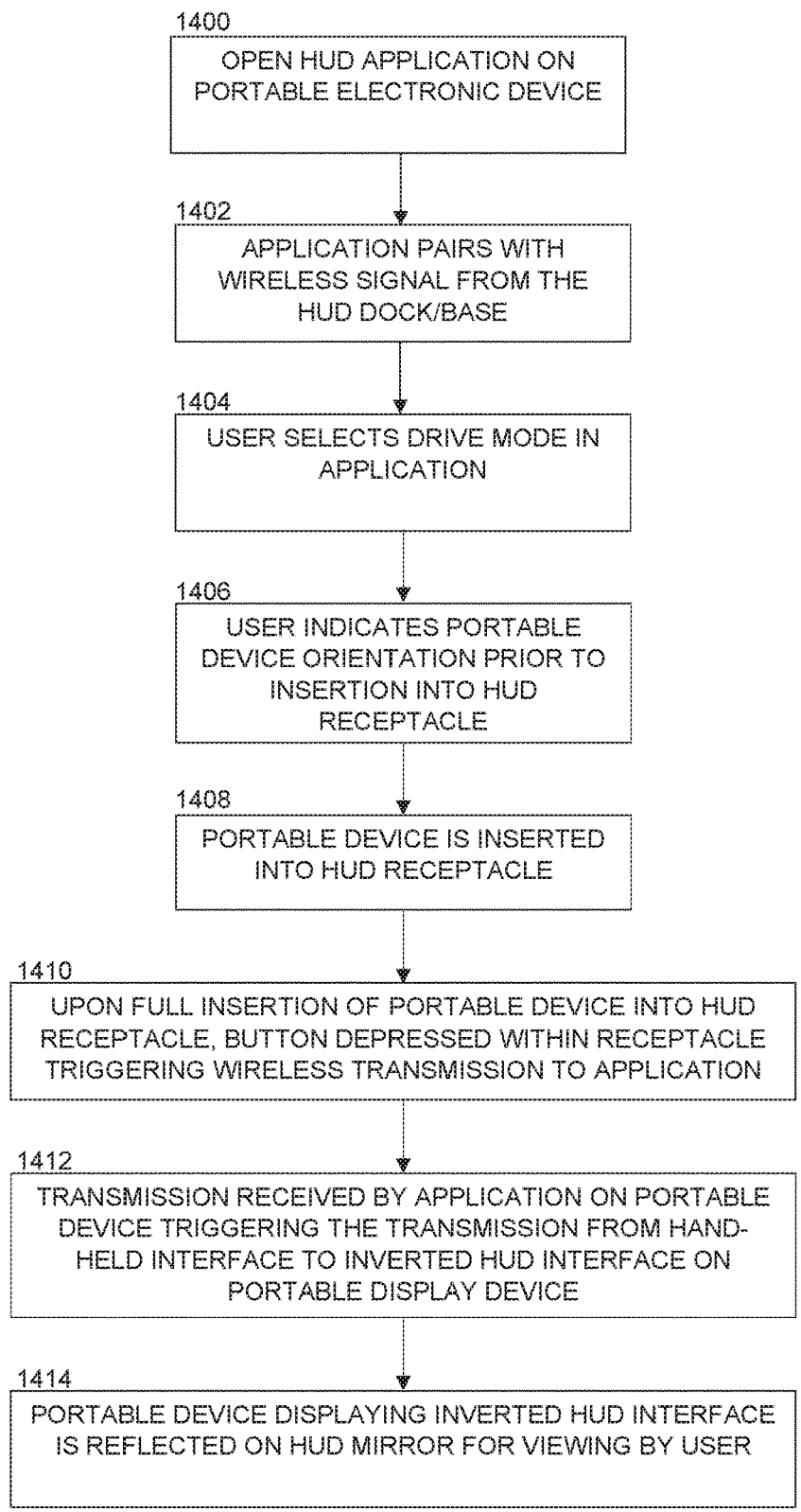
FIG. 14 is a flow chart of an exemplary embodiment of operation of a vehicular heads up display in accordance with principles of inventive concepts.

The flow chart of FIG. 14 illustrates an exemplary process of operating a vehicular heads up display in accordance with principles of inventive concepts. In step 1400 a heads up display (HUD) application is opened on a portable electronic device, such as device 1212. The HUD application pairs with a wireless signal from a HUD base, such as base 1202, in step 1402. Initialization information may be exchanged between the HUD base and portable electronic device at this point. In step 1404 a user selects a "drive" mode, allowing him to interact with the HUD, HUD base, and portable electronic device while driving. In exemplary embodiments a user may indicate in step 1406 to the HUD application which one of a plurality of allowed orientations the portable electronic device will be inserted into the HUD base/receptacle. Such orientations may reflect the automatic re-orientation of a smartphone, for example. The device may then be mated with the HUD base in step 1408 and then wireless transmission between the base and application on the electronic device may be enabled in step 1410 but user interaction, such as activation of a pushbutton, for example. In step 1412 a transmission received by the application on the portable device triggers a transition from the handheld interface to an inverted HUD interface on the portable device's display. From there the process proceeds to step 1414, where the inverted display is reflected on the HUD partially reflective mirror for viewing by the user.

While inventive concepts have been particularly shown and described with references to exemplary embodiments thereof, it will be understood by those skilled in the art that various changes in form and details may be made therein without departing from the scope of inventive concepts encompassed by the appended claims.

What is claimed is:

1. An in-dashboard vehicle heads-up-display system, comprising:
   a vehicle dashboard including:
      a receptacle configured to receive and support a portable electronic device in a display-exposed orientation; and
      a transmission path defined in the dashboard and constructed and arranged to allow transmission of a graphical output from a display of the portable electronic device; and
   a reflective apparatus aligned to receive the graphical output from the display and to reflect the graphical output for use by a driver of the vehicle,
   wherein the reflective apparatus comprises a switchable mirror, the switchable mirror comprising a plurality of layers, including:
      a first protective layer;
      a first liquid crystal layer formed on the first protective layer;
      a second liquid crystal layer formed on the first liquid crystal layer;
      a frost layer formed on the second liquid crystal layer; and
      a second protective layer formed on the frost layer.

2. The system of claim 1, wherein the reflective apparatus is arranged with respect to the display to reflect the graphical output and an angle of between about 60 and 120 degrees with respect to horizontal.

3. The system of claim 1, wherein the reflective apparatus is a flip-up reflective apparatus.

4. The system of claim 1, wherein the reflective apparatus is mounted to the dashboard.

5. The system of claim 4, wherein the reflective apparatus is mounted to the dashboard by at least one hinge or pivot.

6. The system of claim 5, wherein the transmission path is an opening in the dashboard and the reflective apparatus is configured to rotate between a closed position that covers the opening and one or more open positions, each open position corresponding to a different output angle of the reflective apparatus.

7. The system of claim 1, wherein the reflective apparatus is configured to rotate between a plurality of different output angles of the reflective apparatus.

8. The system of claim 1, wherein:
   the first liquid crystal layer has a reflectance of about 50%; and
   the second liquid crystal layer has a reflectance of about 40%.

9. The system of claim 1, further comprising:
   a first anti-reflective coating formed on the first protective layer; and a second anti-reflective coating formed on the second protective layer.

10. The system of claim 1, wherein a degree of reflectance of the switchable mirror is electronically controllable to adjust to ambient lighting conditions and the system further comprises a set of control electronics coupled to the switchable mirror.

11. The system of claim 1, further comprising:
a set of control electronics; and
a wireless communications interface configured to couple the set of control electronics to at least one of the portable electronic device and a set of vehicle control electronics.

12. The system of claim 1, further comprising a computer program product stored on and executable by the portable electronic device and configured to enable control of the portable electronic device via voice commands.

13. The system of claim 1, further comprising a computer program product stored on and executable by the portable electronic device and configured to enable control of the portable electronic device via a wireless remote tactile device.

14. The system of claim 1, wherein the graphical output reflected by the reflective apparatus includes one or more of:
vehicle navigation content;
audio control content;
music control content;
telephone control content;
text message display content;
web browsing content;
vehicle speed;
vehicle direction; and/or
vehicle control content.

15. The system of claim 1, wherein the portable electronic device is a smartphone.

16. A vehicle heads-up-display system, comprising:
a receptacle configured to receive and support a portable electronic device, the receptacle including an opening that enables transmission of a graphical output from a display of the portable electronic device in a first direction;
a mount configured to secure the receptacle within a vehicle;
an electronically controllable, partially reflective switchable mirror mounted in alignment with the display of the portable electronic device to receive and reflect a graphical output from the display at an output angle of between about 60 and 120 degrees with respect to horizontal;
a set of control electronics; and
a wireless communications interface configured to couple the set of control electronics to at least one of the portable electronic device and a set of vehicle control electronics,
wherein the switchable mirror comprises a plurality of layers, including:
a first protective layer;
a plurality of liquid crystal layers formed on the first protective layer, each having a partial reflectance;
a frost layer formed on at least one of the plurality of liquid crystal layers; and
a second protective layer formed on the plurality of liquid crystal layers.

17. The system of claim 16, wherein:
a first liquid crystal layer has a reflectance of about 50%; and
a second liquid crystal layer has a reflectance of about 40%.

18. The system of claim 16, further comprising:
a first anti-reflective coating formed on the first protective layer; and
a second anti-reflective coating formed on the second protective layer.

19. An in-dashboard vehicle heads-up-display system, comprising:
a vehicle dashboard including:
a receptacle configured to receive and support a portable electronic device in a display-exposed orientation; and
a transmission path defined in the dashboard and constructed and arranged to allow transmission of a graphical output from a display of the portable electronic device;
a reflective apparatus aligned to receive the graphical output from the display and to reflect the graphical output for use by a driver of the vehicle, the reflective apparatus comprising a switchable mirror, a degree of reflectance of the switchable mirror being electronically controllable to adjust to ambient lighting conditions; and
a set of control electronics coupled to the switchable mirror,
wherein a camera of the portable electronic device is employed as a light sensor for light-level sensing to automatically control the degree of reflectance of the switchable mirror via the control electronics.

20. The system of claim 19, wherein the switchable mirror comprises a plurality of layers, including at least one liquid crystal layer.

* * * * *